United States Patent
Eckert et al.

(10) Patent No.: US 7,236,947 B2
(45) Date of Patent: Jun. 26, 2007

(54) PROVIDING HIGHLY AUTOMATED PROCUREMENT SERVICES

(75) Inventors: Frieder Eckert, Herrenberg (DE); Atulkumar Mistry, Singapore (SG)

(73) Assignee: Hewlett-Packard Development Company, L.P., Houston, TX (US)

( * ) Notice: Subject to any disclaimer, the term of this patent is extended or adjusted under 35 U.S.C. 154(b) by 826 days.

(21) Appl. No.: 10/056,471

(22) Filed: Jan. 25, 2002

(65) Prior Publication Data

US 2003/0144852 A1 Jul. 31, 2003

(51) Int. Cl.
 *G06Q 30/00* (2006.01)
(52) U.S. Cl. ....................................................... 705/26
(58) Field of Classification Search .................. 705/26, 705/27
 See application file for complete search history.

(56) References Cited

U.S. PATENT DOCUMENTS

| | | | | |
|---|---|---|---|---|
| 4,992,940 A | * | 2/1991 | Dworkin ....................... | 705/26 |
| 5,136,501 A | * | 8/1992 | Silverman et al. ............ | 705/37 |
| 5,375,055 A | * | 12/1994 | Togher et al. ................ | 705/37 |
| 5,689,652 A | * | 11/1997 | Lupien et al. ................ | 705/37 |
| 5,758,328 A | * | 5/1998 | Giovannoli .................. | 705/26 |
| 5,895,454 A | * | 4/1999 | Harrington ................... | 705/26 |
| 6,014,644 A | * | 1/2000 | Erickson ...................... | 705/37 |
| 6,016,504 A | * | 1/2000 | Arnold et al. ............... | 709/200 |
| 6,067,528 A | * | 5/2000 | Breed et al. .................. | 705/26 |
| 6,324,522 B2 | * | 11/2001 | Peterson et al. ............. | 705/28 |
| 6,397,197 B1 | * | 5/2002 | Gindlesperger .............. | 705/37 |
| 6,510,418 B1 | * | 1/2003 | Case et al. .................... | 705/26 |
| 6,535,880 B1 | * | 3/2003 | Musgrove et al. ........... | 707/10 |
| 6,546,374 B1 | * | 4/2003 | Esposito et al. ............. | 705/27 |
| 6,553,346 B1 | * | 4/2003 | Walker et al. ................ | 705/1 |
| 6,587,827 B1 | * | 7/2003 | Hennig et al. ................ | 705/1 |
| 6,598,026 B1 | * | 7/2003 | Ojha et al. .................... | 705/26 |
| 6,643,624 B2 | * | 11/2003 | Philippe et al. .............. | 705/26 |
| 6,847,938 B1 | * | 1/2005 | Moore .......................... | 705/26 |
| 6,850,900 B1 | * | 2/2005 | Hare et al. .................... | 705/26 |
| 6,904,410 B1 | * | 6/2005 | Weiss et al. .................. | 705/27 |
| 6,907,401 B1 | * | 6/2005 | Vittal et al. ................... | 705/26 |
| 6,980,966 B1 | * | 12/2005 | Sobrado et al. .............. | 705/26 |
| 2001/0034631 A1 | * | 10/2001 | Kiselik .......................... | 705/8 |
| 2001/0049636 A1 | * | 12/2001 | Hudda et al. ................. | 705/26 |

(Continued)

FOREIGN PATENT DOCUMENTS

EP 1041521 A2 * 10/2000

(Continued)

OTHER PUBLICATIONS

Gililand, S., "No-Nonsense Accounting," Computer Shopper, vol. 15, No. 8, p. 361, Aug. 1995.*

(Continued)

*Primary Examiner*—Nicholas D. Rosen (57) ABSTRACT

A computer system may be configured to provide highly automated procurement services including the possibility for price non-disclosure. The computer system is coupled to communication devices of a plurality of trading partners via a set of connection networks. A database accessible by the computer system is initialized with information from one or more trading partners. The computer system may be configured to process transactions among the one or more trading partners in a highly automated manner based on information in the database and additional information received during the transactions.

53 Claims, 7 Drawing Sheets

U.S. PATENT DOCUMENTS

| | | | |
|---|---|---|---|
| 2002/0019761 A1* | 2/2002 | Lidow | 705/10 |
| 2002/0023046 A1* | 2/2002 | Callahan et al. | 705/37 |
| 2002/0062275 A1* | 5/2002 | Dyke | 705/37 |
| 2002/0069121 A1* | 6/2002 | Jain et al. | 705/26 |
| 2002/0099638 A1* | 7/2002 | Coffman et al. | 705/37 |
| 2002/0111894 A1* | 8/2002 | Stevens | 705/37 |
| 2002/0178021 A1* | 11/2002 | Melchior et al. | 705/1 |
| 2002/0188682 A1* | 12/2002 | Jain et al. | 709/205 |
| 2003/0110054 A1* | 6/2003 | Lindquist | 705/1 |
| 2003/0120585 A1* | 6/2003 | Rosenblatt | 705/37 |
| 2003/0126095 A1* | 7/2003 | Allen | 705/80 |
| 2003/0191710 A1* | 10/2003 | Green et al. | 705/40 |
| 2004/0039650 A1* | 2/2004 | Lentz | 705/26 |
| 2004/0073507 A1* | 4/2004 | Scott et al. | 705/37 |
| 2005/0060245 A1* | 3/2005 | Hoffman et al. | 705/28 |
| 2006/0178950 A1* | 8/2006 | Van Etten et al. | 705/26 |
| 2006/0259418 A1* | 11/2006 | Feaver et al. | 705/37 |

FOREIGN PATENT DOCUMENTS

| | | | |
|---|---|---|---|
| JP | 2001-357314 A | * | 12/2001 |
| KR | 2001000612 A | * | 1/2001 |
| WO | WO-0137538 A2 | * | 5/2001 |

OTHER PUBLICATIONS

Fan, S., "Focus on the Future: Harnessing the Internet to Streamline Procurement of Mechanical Equipment," Air Conditioning, Heating, & Refrigeration News, vol. 209, No. 6, p. 105, Feb. 7, 2000.*

Anon., "TradeCard, Bureau Veritas Announce Partnership," Business Wire, May 2, 2000.*

Anon., "WinEstimator, Inc. and PurchasePro.com Create Construction E-Commerce Portal," Business Wire, May 8, 2000.*

Anon., "Information Flow Saves Time," Transportation & Distribution, vol. 41, No. 12, p. S36, Dec. 2000.*

Anon., "Teknion Selects New iBaan Solution to Drive Major Collaborative Commerce Initiatives," PR Newswire, p. 914, Jan. 30, 2001.*

* cited by examiner

PROVIDING HIGHLY AUTOMATED PROCUREMENT SERVICES

BACKGROUND

In a typical business transaction, a customer (whether an individual consumer or a business entity) initiates the transaction by placing a purchase request with a seller/agent via a communication means such as telephone, mail, facsimile, private networks (e.g., electronic data interchange (EDI)), Internet (e.g., email), or other communication networks, as appropriate. A seller/agent often does not manufacture the products it sells but obtains them from various suppliers. For example, a bookstore, which accepts purchase requests from customers for books, generally obtains the books from one or more publishers.

Such business transactions (e.g., transactions involving at least a customer, a seller/agent, and a supplier) are typically handled in a mostly manual fashion within the seller/agent's organization. Manual processes are time consuming, prone to error, and generally not capable of real time status inquiries. For example, external entities in a transaction, such as customers and suppliers, do not have ways to directly communicate with each other (either at all or at least not in real time). Typically, external entities have to communication via the seller/agent. In addition, when a customer or a supplier makes a change after the original order has been placed, the change again needs to be processed manually via the seller/agent, thus, causing more delays and possibilities for error in the transaction.

There exist several commercially available so-called enterprise resource planning (ERP) software programs capable of linking computer systems or resources in various departments within a company. These software programs are made by Baan, SAP, PeopleSoft, J. D. Edwards, Oracle, and other companies. When properly installed and configured, such software may provide automation within a company by supporting proper organization and updating of a central internal database accessible by all departments within the company. The central internal database is typically not directly accessible by any external entities, such as customers and suppliers.

In an ad hoc solution to the foregoing, some companies have created a duplicate external database to permit limited access by external entities. However, this approach typically requires custom interfaces between the internal and external databases, which in turn require additional investment to develop and maintain.

Further, the duplicate external database typically has to be periodically synchronized with an internal central database. For example, information regarding inventory levels or prices for each product by each supplier in the external database has to be kept up-to-date. Even the best data synchronization schedule, however, typically does not allow real time synchronization. For example, an external entity may receive an erroneous confirmation for an order placed prior to the next scheduled synchronization. During the next synchronization, the system may then realize that the true inventory level of the ordered product is below the quantity requested by the external entity. Thus, even with an external interface, the external entities remain unable to communicate with the seller/agent or with each other in real time.

Thus, it is desirable to provide methods and systems for improved procurement services that are capable of operating in a highly automated manner and/or allowing communication of procurement information to and among external entities.

SUMMARY

A computer system may be configured to provide highly automated procurement services. The computer system is coupled to a plurality of trading partners via a set of connection networks. A database accessible by the computer system is initialized with information from one or more trading partners. Examples of initialization information include pricing, terms and conditions, and purchase forecast information. A trading partner may be a supplier trading partner, a customer trading partner, or another entity depending on the applicable transaction.

In one exemplary embodiment, the computer system may be configured to receive a purchase request from a first trading partner and, in response thereto, automatically[1] select at least one qualified trading partner[2] from the available trading partners, generate a purchase order based at least in part on the purchase request, and forward the purchase order to the selected qualified trading partner. The qualified trading partner may be selected based on those whose information has previously been placed in the database (e.g., upon initialization or at any other point prior to this transaction) and the purchase request. Alternatively, the qualified trading partner may be added in connection with the purchase request.

[1] Of course, the system could also be configured to allow occasional manual selection (e.g., overrides) or a combination of manual and automatic selection.

[2] One or more trading partners may be selected to fulfill each purchase request, depending on information in the database.

After receiving the purchase request, the qualified trading partner may enter an acknowledgment into the computer system via its communication device. The computer system may be configured to automatically[1] process the acknowledgment, optionally including forwarding the acknowledgment to the first trading partner. Prior to granting access to a trading partner, the computer system may require the trading partner to authenticate itself or otherwise verify its identity. For example, a trading partner may have to log in before placing a purchase request.

In connection with fulfillment of the purchase order, the qualified trading partner may wish to enter a shipment notice into the computer system. In an exemplary embodiment, the computer system may be configured to receive a shipment notice from the qualified trading partner, automatically[1] forward the shipment notice to the first trading partner, create an accounts payable file, create an accounts receivable file, and/or forward the accounts payable and accounts receivable files to an accounts payable database and an accounts receivable database, respectively.

From time to time, a trading partner may not act entirely in accordance with the terms and conditions, or purchase forecasts, that were stored into the database. Accordingly, in an exemplary embodiment, the computer system may be configured to automatically[1] detect an exception and generate an exception report. If the exception is not acceptable to an involved trading partner, an escalation process may be requested by that involved trading partner. In one embodiment, the computer system may attempt to resolve the escalation request by forwarding the escalation request to customer service. Customer service may negotiate with at least one of the involved trading partners and/or forward the negotiation result to at least one other of the involved trading partners.

Sometimes, after placing an order, a trading partner may wish to change the order (e.g. quantity of the order). Accordingly, in an exemplary embodiment, the computer system may be configured to automatically[1] forward a change order request received from that trading partner to the other involved trading partner(s). In addition, the computer system may be configured to automatically detect any exception in the change order transaction. If a detected exception is unacceptable to one of the involved trading partners, the computer system may further be configured to resolve the exception and/or an escalation request (as described above or otherwise).

In an exemplary embodiment, a trading partner may also wish to enter purchase forecast information into the computer system. The computer system may be configured to receive the purchase forecast information and, in response thereto, automatically select at least one qualified trading partner, forward the purchase forecast information to that at least one qualified trading partner, and/or store the purchase forecast information in the database. Again, during this process, the computer system may be configured to automatically[1] detect any exception. If a detected exception is unacceptable to one of the involved trading partners, the computer system may further be configured to resolve the exception and/or an escalation request (as described above or otherwise).

DETAILED DESCRIPTION

Figure 1:
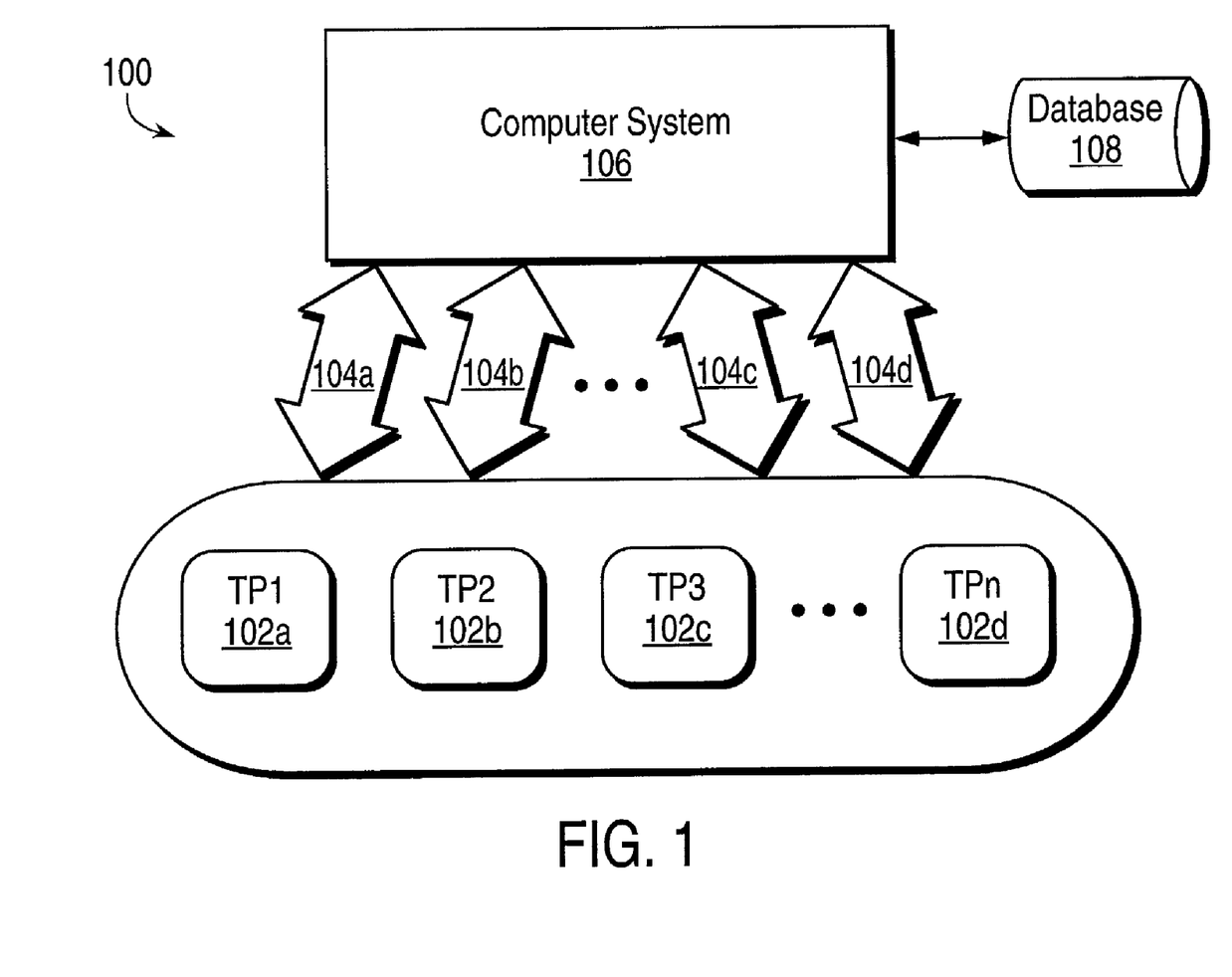
FIG. 1 illustrates a system in accordance with an exemplary embodiment.

FIG. 1 illustrates an exemplary overall system 100 for providing highly automated[3] procurement services in accordance with a transaction. The system 100 includes communication devices 102a–d coupled to and/or accessible by a plurality of trading partners[4], such as customers and suppliers, a set of connection networks 104a–d coupled to the communication devices 102a–d, and a computer system 106 that is capable of communicating with the plurality of trading partners via the set of connection networks 104a–d and the communication devices 102a–d.

[3] The degree of automation can be varied to suit the needs of particular implementations. Thus, in some systems, the automation can be absolute, while others might be configured to allow a combination of manual and automatic operation (e.g., manual overrides). Thus, as used throughout this description, the term "automated" (including all its variants) should be understood to include a range of operations, all of which contain significant—and possible but not necessarily absolute—automation.

[4] As used herein, when communicating with a trading partner, it is understood that such communication is performed via one or more of the communication devices 102a–d that are coupled to and/or are accessible by the trading partner.

In an exemplary embodiment, each of the plurality of trading partners is registered with the computer system 106. In one aspect of this embodiment, each registered trading partner is provided with a log-in name and/or a password or other verification mechanism for accessing the computer system 106. In an exemplary embodiment, the computer system 106 is controlled by software configured to provide highly automated procurement services in accordance with the embodiments. Any computer system capable of fast data processing, for example, a server computer, together with software written in any programming language executable on such computer, and any necessary databases or other ancillary subsystems, may be used to implement the various embodiments. Such implementation details may be varied in accordance with the available computing infrastructure and the desires of the system users, and need not be described in further detail here. In addition, the various processes described below as performed by or in connection with the computer system 106 can be implemented as subsystems or sub-modules to computer system 106, depending on the particular implementation. Further, while many exemplary processes will be described in various exemplary embodiments, various subsets or combinations of (including possibly all) such processes may be utilized in accordance with specific implementations.

The computer system 106 typically has access to a database 108 that maintains inventory, pricing, terms and conditions, purchase forecasts, and other information about the plurality of trading partners for facilitating transactions among the trading partners in substantially real time. As used here, the term "substantially" includes communications that occur in actual real time and communications that occur close to real time, depending on the particular embodiment implemented.

In an exemplary embodiment, the set of connection networks 104a–d includes connections via the Internet using the RosettaNet business process standards and extensible markup language (XML) data format 104a, the EDI (i.e., private electronic messaging service based on a collection of standard message formats and element dictionary) 104b, Web portal 104c (e.g., via a browser that is connected to the Internet for communications via user interfaces, scripting languages, email, and/or other well known Web mechanisms), and other communication means 104d (e.g., mail, fax, phone, etc.), as appropriate. Through the set of connection networks 104a–d, each registered trading partner may receive orders, change orders, cancel orders, send forecast files, enter shipment information, check order status, forecast status, and/or perform other applicable processes through the computer system 106 in a highly automated manner.

For ease of explanation, the exemplary processes described in FIGS. 2–7 below are described in the context of a customer trading partner and a supplier trading partner. In practice, however, there is no limitation to a single trading partner at each end of the transaction. In other words, multiple trading partners may access the computer system 106 at the same time and may be involved in the same transaction, in overlapping transactions, or in other related transactions. In addition, a trading partner may be a customer trading partner, a supplier trading partner, or still other parties, depending on the applicable transaction. Further, as used herein, a supplier is not restricted to a manufacturer of goods or direct provider of services, but could be a reseller, distributor, marketing or sales agent, or any other intermediary or other party involved in the supply process.

Figure 2:
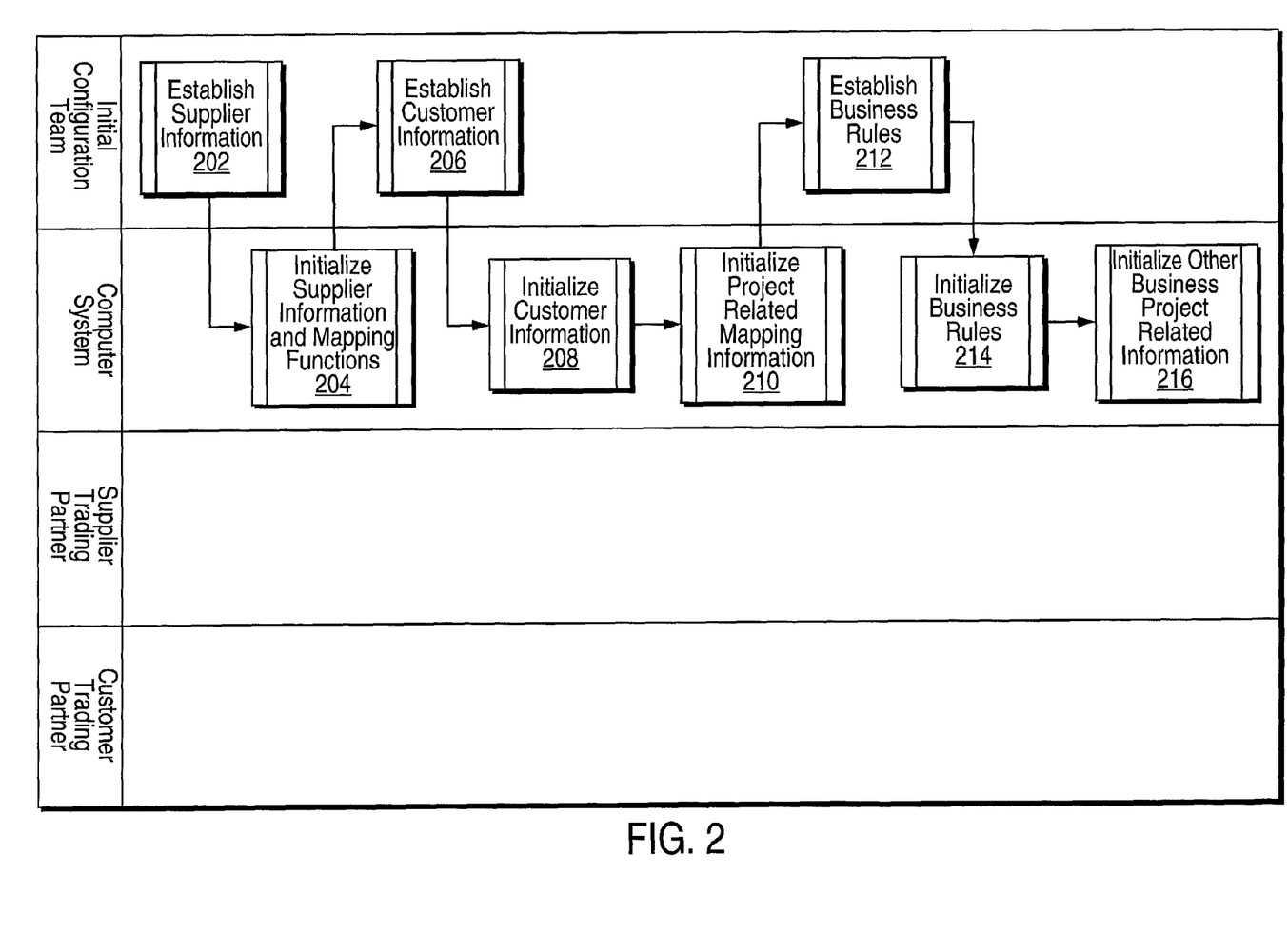
FIG. 2 illustrates an initialization process in accordance with an exemplary embodiment.

FIG. 2 illustrates an initialization[5] process in accordance with an exemplary embodiment. At step 202, supplier information from supplier trading partners is established. In an exemplary embodiment, supplier information may be obtained by personnel at the seller/agent from each supplier trading partner. Alternatively, a supplier trading partner may fill out a form or otherwise provide information to the seller/agent. Examples of supplier information with respect to a supplier trading partner include preferred connectivity information (e.g., via EDI, RosettaNet, or other communication means), pricing, payment terms, and/or other contractual terms and conditions (hereinafter "supplier information"). The established supplier information is stored into the database 108 via the computer system 106 (step 204). In an exemplary embodiment, at step 204, mapping functions that map related supplier trading partners to each other (e.g., trading partners that offer the same product) are also performed.

[5] The data input processes described herein are typically performed during initialization, but could also be performed at some other stage, for example, as part of updating. Thus, the term initialization should be understood to include not only the first, but also any subsequent data entries, so long as the data are entered prior to or at the time of use.

Likewise, customer information from customer trading partners is established (step 206). Examples of customer information include preferred connectivity information, purchase forecasts, and/or other contractual information (hereinafter "customer information"). The established customer information is stored into the database 108 (step 208) via the computer system 106. In an exemplary embodiment, if a customer trading partner wishes to make a purchase via the seller/agent, a business project identification (e.g., a unique sequential number) is assigned to the business project involving the customer trading partner and potentially one or more supplier trading partners. Customer information relating to that customer trading partner is associated with each business project identification related to that customer trading partner.

In an exemplary embodiment, for each business project, personnel at the seller/agent may identify one or more potential supplier trading partners who might be able to fulfill the customer trading partner's requirements. For example, a customer trading partner may be mapped to one or more potential supplier trading partners, who may be capable of fulfilling the forecast quantities specified in a business project. The mapping information (e.g., information relating to each set of customer and supplier(s) that are mapped to each other) is entered into the database 108 via the computer system 106 (step 210).

Next, business rules are established for automatically[1] resolving issues arising out of or relating to business projects (step 212). For example, if more than one potential supplier trading partners are identified for a business project associated with a customer trading partner, business rules are established to allow the computer system 106 to automatically[1] decide which potential supplier trading partner(s) should be selected to fulfill each purchase request arising out of that business project. For example, if five potential supplier trading partners are identified for a business project, in response to receiving a purchase request arising out of that business project, the computer system 106 may automatically[1] select two out of the five potential supplier trading partners (i.e., two qualified supplier trading partners) to fulfill that purchase request because so selecting yields the highest profit margin for the seller/agent, meets the customer trading partner's required delivery schedule, and/or other reasons set by the business rules.

In addition, business rules may also be established to allow the computer system to automatically[1] decide how fulfillment of a purchase request should be split among selected qualified supplier trading partners (i.e., percentage to be allocated to each qualified supplier trading partner). In one example, the business rules may allow the computer system 106 to automatically[1] split an order based on a percentage combination that yields the highest profit margin for the seller/agent (e.g., 40% by qualified supplier trading partner A and 60% by qualified supplier trading partner B). In another example, the business rules may allow the computer system 106 to automatically[1] split an order based on a percentage combination that meets the delivery schedule required by the customer trading partner. In yet another example, business rules may include rules relating to minimum/maximum order quantity and delivery schedules. The established business rules are entered into the database 108 via the computer system 106 (step 214).

Information specific to each business project (e.g., different shipment addresses for each potential supplier trading partner) and/or specific to each product is also stored into the database 108 via the computer system (step 216).

In an exemplary embodiment, the initialization process may be performed by personnel at the seller/agent who maintain the computer system 106. For example, information is gathered from or about trading partners then entered into the computer system 106 by such personnel. In this embodiment, the system is configured to provide appropriate data entry screens to be used by the personnel to enter information. Alternatively, such information could (in whole or in part) be entered by the trading partners themselves.

Figure 3:
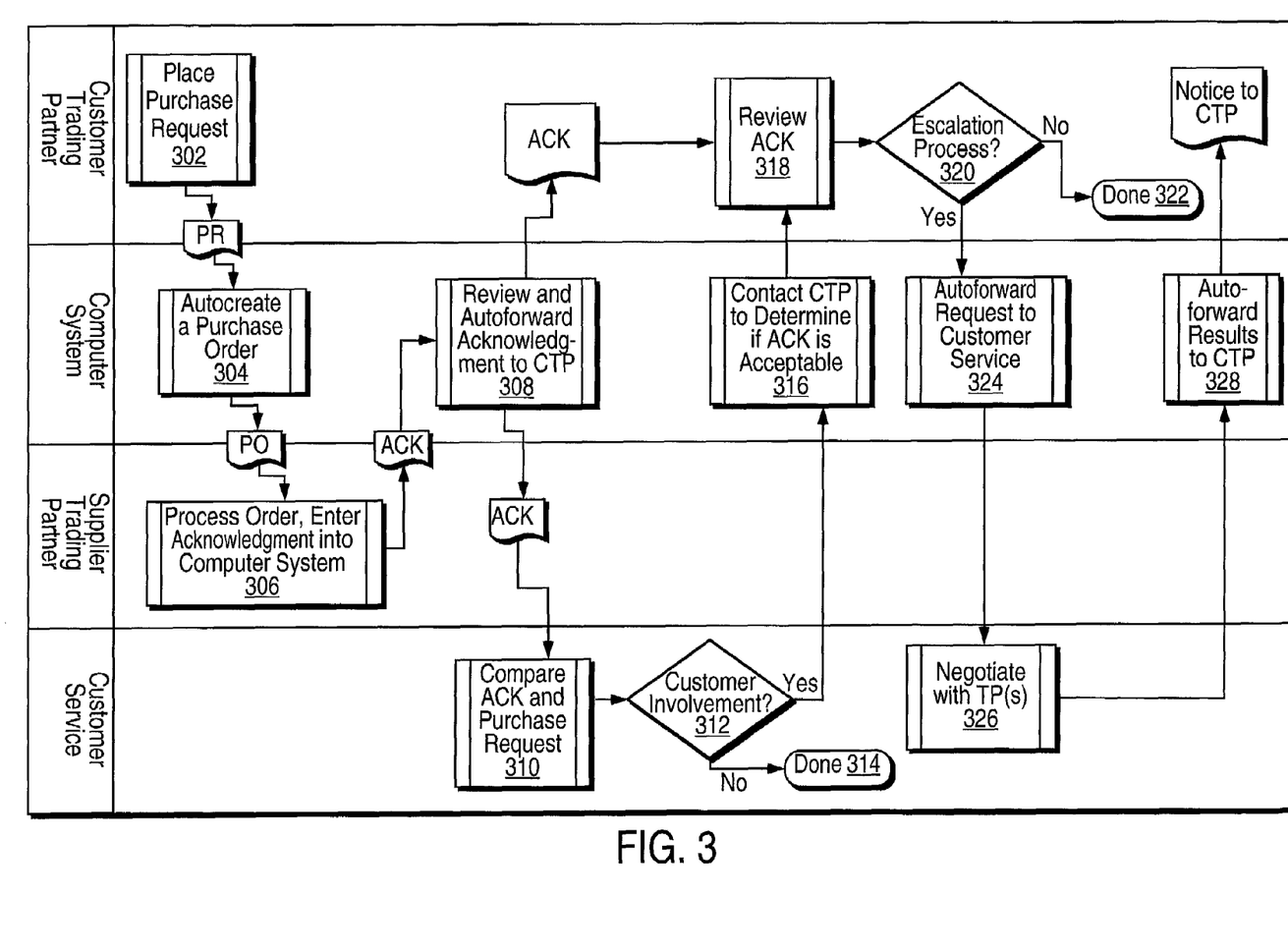
FIG. 3 illustrates an order management process in accordance with another exemplary embodiment.

FIG. 3 illustrates an order management process in accordance with an exemplary embodiment. At step 302, a customer trading partner[5] places a purchase request via a connection network 104 coupled to the computer system 106. In an exemplary embodiment, the purchase request is associated with business project having a previously assigned business project identification (see step 206 in FIG. 2). In one embodiment, using the business project identification, the computer system 106 may be configured to look up related business rules and other information (e.g., supplier information, customer information, mapping information, business project related information, etc.) stored in the database 108 for automatically[1] selecting at least one qualified supplier trading partner to fulfill the purchase request and, if more than one qualified supplier trading partners are selected, allocating the order among the qualified supplier trading partners.

[5] The data input processes described herein are typically performed during initialization, but could also be performed at some other stage, for example, as part of updating. Thus, the term initialization should be understood to include not only the first, but also any subsequent data entries, so long as the data are entered prior to or at the time of use.

The computer system 106 is configured to automatically[1] create a purchase order based on the purchase request (step 304). In an exemplary embodiment, the purchase order may include the business project identification associated with the purchase request, information related to one or more selected qualified supplier trading partner (e.g., preferred connectivity to each qualified supplier trading partner, price for the requested product, etc.), information to be sent to one or more selected qualified supplier trading partner (e.g., quantity of the requested product, shipment address, delivery schedule, etc.), and other information generally related or specific to this purchase request.

In an exemplary embodiment, price confidentiality is maintained by configuring the computer system 106 to select one or more qualified supplier trading partners without revealing to the customer trading partner different prices offered by the selected qualified supplier trading partners. Likewise, the computer system 106 may be configured to not reveal to the selected one or more qualified supplier trading partners the purchase price agreed to by the customer trading partner.

Next, the computer system 106 forwards the purchase order to the selected qualified supplier trading partner(s) (e.g., via the preferred connectivity associated with the selected qualified supplier trading partner(s)). In an exemplary embodiment, the qualified supplier trading partner may also receive an email or alert from the computer system 106 indicating that a customer trading partner is awaiting an acknowledgment for its purchase order. The qualified supplier trading partner(s) may enter an acknowledgment of the purchase order, via a connection network 104, into the computer system 106 (step 306). The computer system 106 reviews the received acknowledgment from the supplier trading partner and forwards the acknowledgment to the customer trading partner (step 308). In an exemplary embodiment, at step 308, the computer system 106 may also be configured to automatically[1] detect (with or without human assistance) an exception in the acknowledgment. For example, an exception could be detected when the qualified supplier trading partner is unable to fulfill the quantity (or some other specification) requested in the purchase order contrary to the supplier trading partner's agreed to terms and conditions.

If an exception is detected, an exception report (e.g., an email or alert) may be generated and forwarded to customer service, which typically includes at least some human personnel (preferably live, but possibly also with delayed response) or other suitable means (for example, sophisticated automated customer service software) for exception resolution (step 310). In an exemplary embodiment, the computer system may also forward the information in the acknowledgment in addition to or as a part of the exception report. The exception report thus generated and forwarded can be used for a variety of purposes appropriate to the needs of the particular implementation, including without limitation, monitoring supplier performance, providing information to customer service for exception resolution, or other feedback or record keeping purposes.

Next, the exception report forwarded to customer service may indicate whether the customer trading partner has requested to be involved when an exception is detected (step 312). In one embodiment, whether or not a trading partner wishes to be involved when an exception is detected could have been entered into the computer system 106 during an earlier initialization process (e.g., see FIG. 2). Alternately, customer service may determine, independently of the exception report, to negotiate with one or more of the involved trading partners to resolve the exception. If the customer does not wish to be involved, the process ends (step 314). If, on the other hand, it is determined that the customer trading partner is to be involved, customer service can contact the customer trading partner via the computer system 106 to determine if the exception/acknowledgment is acceptable (step 316). The customer trading partner reviews the exception/acknowledgment (step 318).

If the acknowledgment is unacceptable to the customer trading partner, an escalation process in the computer system 106 can be initiated, either automatically[1] or by the customer trading partner (step 320). An escalation process request is forwarded to customer service (whether software-based and/or with a human component) via the computer system 106 (step 324) where customer service attempts to resolve any issues by negotiating with one or more of the involved trading partners (step 326). The result of the negotiation[6] can be forwarded to the customer trading partner via the computer system 106 (step 328) and the appropriate network 104.

[6]An involved trading partner may refuse to negotiate. In such a case, the result of the negotiation includes a refusal to negotiate by that involved trading partner.

Referring back to step 320, if the acknowledgment is acceptable to the customer trading partner, the process ends (step 322).

Figure 4:
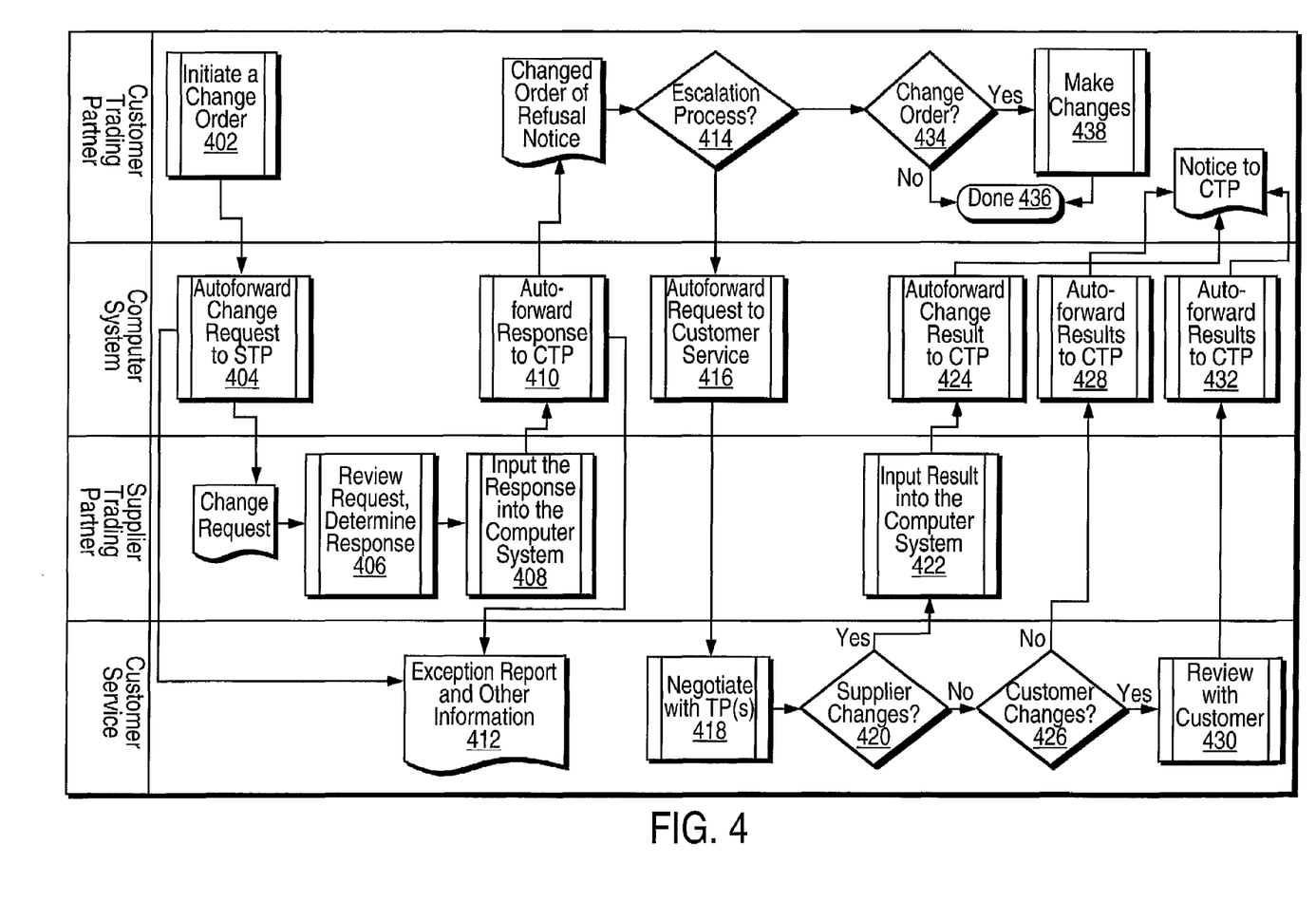
FIG. 4 illustrates a customer-initiated change order process in accordance with another exemplary embodiment.

FIG. 4 illustrates a customer-initiated change order process in accordance with an exemplary embodiment. At step 402, a customer trading partner initiates a change order request and enters the request into the computer system 106. The computer system 106 automatically[1] forwards the change order request to one or more qualified supplier trading partners who are involved in the transaction where the change order request originated (hereinafter "the supplier trading partner") (step 404). In an exemplary embodiment, at step 404, the computer system 106 may also automatically detect any exception in the change order request. If an exception is detected (e.g., the customer trading partner now wishes to order more or less than its forecast quantity), the computer system 106 may generate an exception report and forward the exception report (including or along with the change order request) to customer service (step 412). The supplier trading partner reviews the change order request and determines a response (step 406), then updates the computer system 106 with the response (step 408). The computer system 106 may automatically[1] forward the response to the customer trading partner (step 410). In an exemplary embodiment, at step 410, the computer system 106 may also automatically[1] detect an exception in the response. If an exception is detected (e.g., the supplier refuses to accept the change order even though it falls within the customer's forecast quantity), an exception report may be generated and forwarded (including or along with the response) to customer service (step 412). When the customer trading partner receives the supplier trading partner's response, the customer trading partner determines whether the response is acceptable. If the response is not acceptable, an escalation process is requested (step 414). The escalation process request can be forwarded by the computer system 106 to customer service, which can attempt to resolve any issues by negotiating with at least one of the involved trading partners[6] (step 418). If the supplier trading partner agrees to changes that are acceptable to the customer trading partner (step 420), the supplier trading partner can enter the appropriate changes into the computer system 106 (step 422), such changes can be automatically[1] forwarded to the customer trading partner (step 424).

Referring back to step 420, if the supplier trading partner cannot/does not agree to changes that are acceptable to the customer trading partner, customer service can optionally determine if the customer trading partner wants to make any more changes (modifications, cancellation, etc.) to its order (step 426). If not, the customer trading partner is notified of the final result via the computer system 106 (step 428). If, however, the customer trading partner wants to make more changes (e.g., the customer trading partner may decide to go back to its original order which was acceptable to the supplier trading partner), the changes are reviewed with the customer trading partner (step 430) and the customer trading partner is notified of the final result via the computer system 106 (step 432). In an exemplary embodiment, the supplier trading partner is also notified of the final result via the computer system 106 (not shown).

Referring back to step 414, if no escalation process is requested, the customer trading partner determines whether any other changes to the order is needed (step 434). If not, the process ends (step 436). If more changes are needed, those changes are made (step 438), then the process ends (step 436). In an exemplary embodiment, if more changes are needed at step 438, the process may begin again at step 402 for those additional changes.

Figure 5:
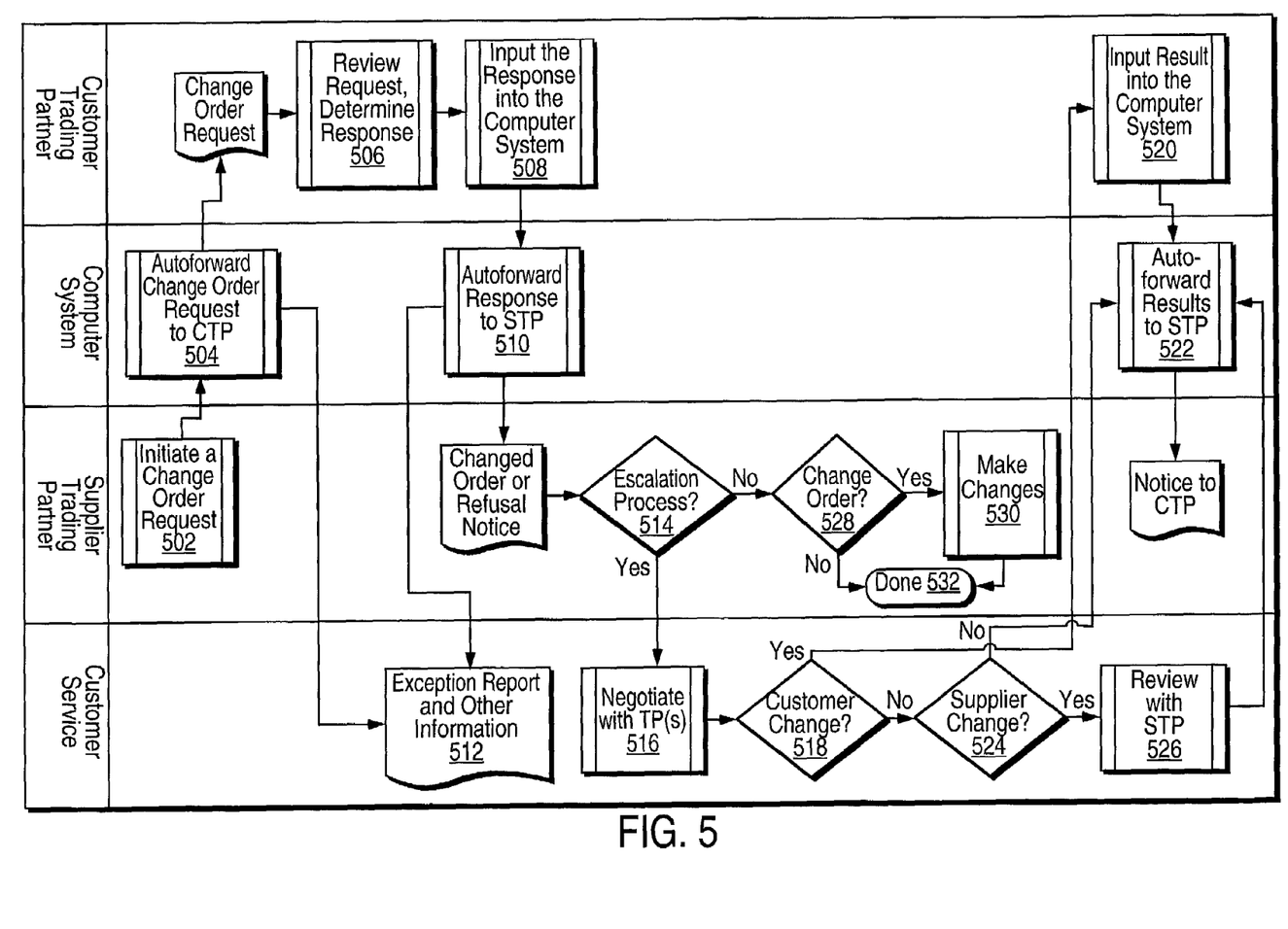
FIG. 5 illustrates a supplier-initiated change order process in accordance with another exemplary embodiment.

FIG. 5 illustrates a supplier-initiated change order process in accordance with an exemplary embodiment. At step 502, a supplier trading partner initiates a change order request and enters the request into the computer system 106 (e.g., the supplier trading partner may request a change in the delivery date). The computer system 106 is configured to automatically forward the change order request to a customer trading partner who is involved in the transaction where the change order request originated (step 504). In an exemplary embodiment, at step 504, the computer system 106 may automatically[1] detect any exception in the change order request. If an exception is detected (e.g., the supplier trading partner now refuses to fulfill an order of an agreed-to quantity or some other specification), the computer system 106 may generate an exception report and forward the report (including or along with information in the change order request) to customer service (step 512).

The customer trading partner can review the change order request and determine a response (step 506), then update the computer system 106 with the response (step 508). The computer system 106 may automatically[1] forward the response to the supplier trading partner (step 510). In an exemplary embodiment, at step 510, the computer system 106 may also automatically[1] detect any exception in the response. If an exception is detected (e.g., the customer refuses to accept the change order even though the new quantity falls within the supplier's agreed to quantity), an exception report may be generated and forwarded (including or along with information in the response) to customer service (step 512). When the supplier trading partner receives the customer trading partner's response, it determines whether the response is acceptable. If the response is unacceptable, the supplier trading partner may make an escalation process request (step 514). The escalation process request is forwarded by the computer system 106 to customer service, which can attempt to negotiate with at least one of the involved trading partners[6] (step 516). If the customer trading partner agrees to changes that are acceptable to the supplier trading partner (step 518), the customer trading partner then inputs the changes into the computer system 106 (step 520). The computer system 106 may automatically forward the final change results to the supplier trading partner (step 522).

Referring back to step 518, if customer trading partner cannot/does not agree to changes that are acceptable to the supplier trading partner (e.g., customer does not agree to the new delivery date), customer service may determine whether the supplier wants to make any more changes to its order (e.g., to change back to the original delivery date) (step 524). If not, the supplier trading partner is notified of the final result via the computer system 106 (step 522). If supplier wants to make more changes, the changes are reviewed with the supplier (e.g., the supplier may agree to honor the original delivery date) (step 526) and the supplier trading partner is notified of the final result via the computer system 106 (step 522). In an exemplary embodiment, the customer trading partner is also notified of the final result via the computer system 106 (not shown).

Referring back to step 514, if no escalation process is requested, the supplier trading partner can determine whether any other changes to the order is needed (step 528). If not, the process ends (step 532). If more changes are needed, those changes can be made (step 530), then the process ends (step 532). In an exemplary embodiment, if more changes are needed at step 530, the process may begin again at step 502 for those changes.

Figure 6:
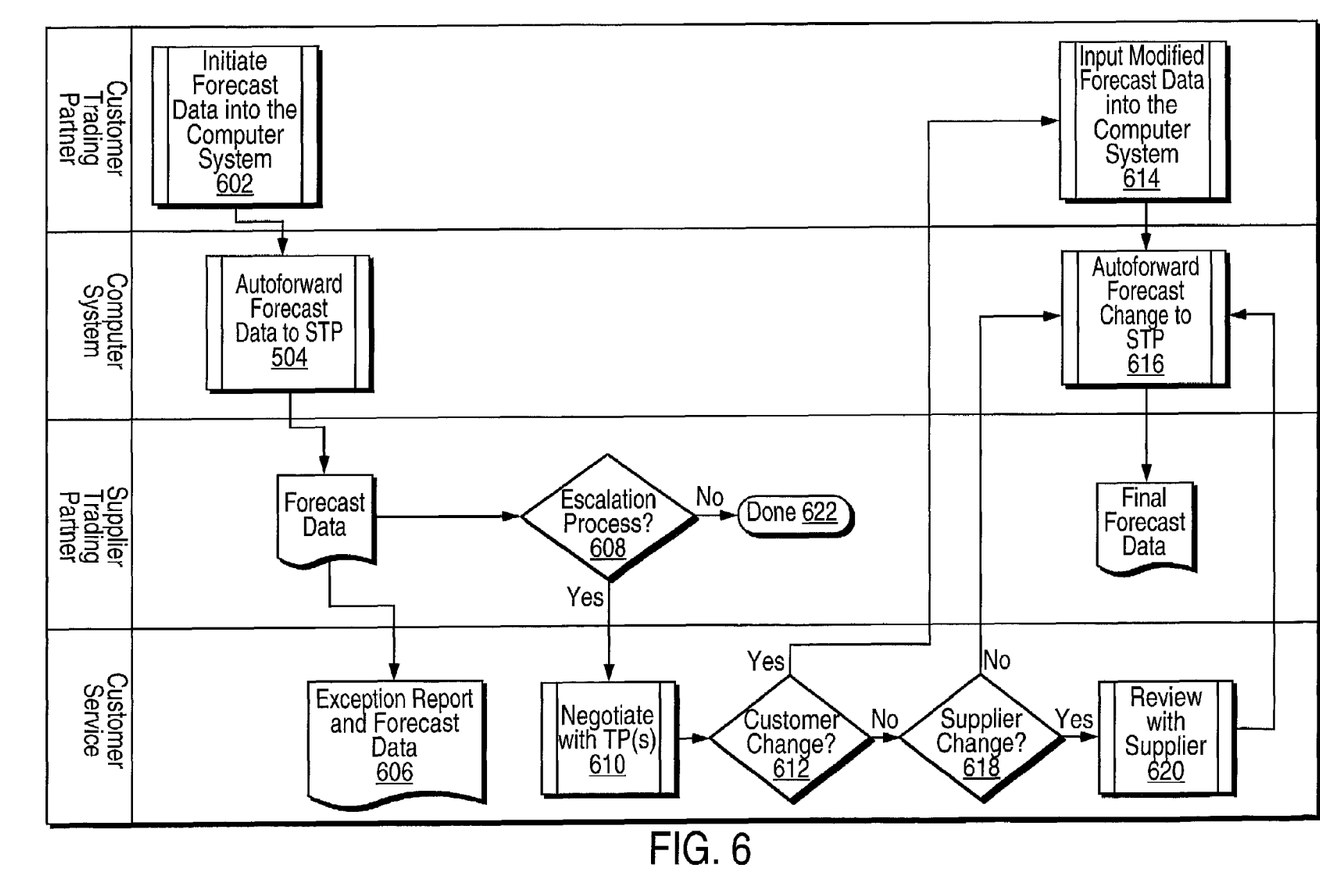
FIG. 6 illustrates a forecast process in accordance with another exemplary embodiment.

FIG. 6 illustrates a forecast process in accordance with an exemplary embodiment. At step 602, a customer trading partner initiates (or enters) forecast data into the computer system 106. The computer system 106 is configured to automatically[1] forward the forecast data to at least one qualified supplier trading partner (step 604). In one embodiment, the computer system 106 may automatically[1] select one or more qualified supplier trading partner based on the business rules and information stored in the database 108. For example, the forecast data may be associated with a business project that has a previously assigned business project identification. Using the business project identification, the computer system 106 may be configured to look up related business rules and information stored in the database 108 to select the qualified supplier trading partner(s).

In an exemplary embodiment, at step 604, the computer system 106 may also automatically detect any exception. If an exception is detected (e.g., when the new forecast quantity is more than the original forecast quantity), an exception report may be generated and forwarded (including or along with information in the forecast data) to customer service (step 606). After receiving the forecast data, the supplier trading partner may request an escalation process because the forecast is unacceptable (step 608). If an escalation process is requested, the request is forwarded to customer service by the computer system 106. Customer service may attempt to resolve any issues by negotiating with at least one of the involved trading partners[6] (step 610). If the customer trading partner wants to make more changes (step 612), the customer trading partner may input modified forecast data into the computer system 106 (step 614). The modified forecast data may be automatically[1] forwarded via the computer system 106 to the qualified supplier trading partner (step 616). In an exemplary embodiment, if more changes are made at step 612, the process may begin again at step 602 for those changes.

Referring back to step 612, if the customer trading partner does not want to make any more changes, it is determined whether the supplier trading partner wants to make any changes (e.g., to accept the forecast data even though it is more or less than the original forecast quantity) (step 618). If so, customer service reviews the changes with the supplier trading partner (step 620) and the computer system 106 forwards the final results to the supplier trading partner (step 616). In an exemplary embodiment, the customer trading partner is also notified of the final results via the computer system 106 (not shown). Referring back to step 618, if the supplier trading partner does not want to make any changes, the computer system 106 forwards the final result to the supplier trading partner (step 616).

Figure 7:
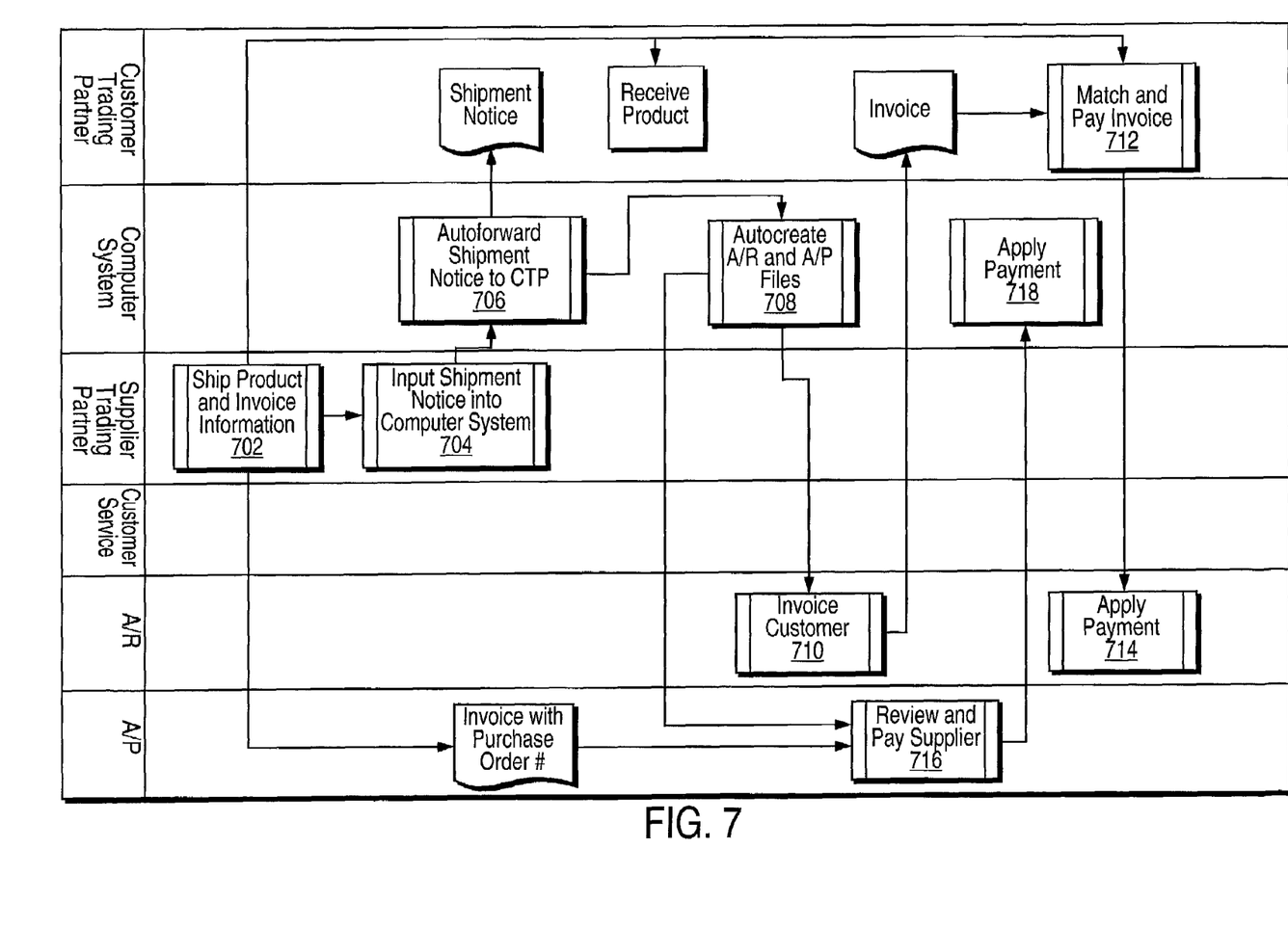
FIG. 7 illustrates an order fulfillment process in accordance with another exemplary embodiment.

FIG. 7 illustrates an order fulfillment process in accordance with an exemplary embodiment. At step 702, a supplier trading partner ships an ordered product to a customer trading partner. In an exemplary embodiment, at step 702, the supplier trading partner also sends shipping information and/or invoice information to the customer trading partner and/or accounts payable database maintained by the seller/agent, respectively. Next, the supplier trading partner may enter a shipment notice into the computer system 106 (step 704). In one embodiment, the shipment notice may include information such as shipment carrier name, shipment tracking number, etc. The computer system 106 automatically[1] forwards the shipment notice to the customer trading partner (step 706) who is to receive the product. In an exemplary embodiment, the computer system 106 may also automatically¹ create or update an accounts receivable file and/or an accounts payable file based on the shipment information (step 708) and forward the files to accounts receivable and/or accounts payable databases, respectively. In an exemplary embodiment, the accounts receivable database and/or the accounts payable database may be maintained by the computer system 106 or by a separate seller/agent's finance system that is accessible by the computer system 106.

Based on the accounts receivable file, the computer system 106 or the finance system may generate an invoice and send it to the customer trading partner via the computer system 106 (step 710). When the customer trading partner receives an invoice, it matches the shipping information from the supplier trading partner and pays the seller/agent via the computer system 106 (step 712). The payment is applied in the accounts receivable database via the computer system 106 and/or the finance system (step 714).

Based on the accounts payable file, the computer system 106 or the finance system may match the invoice received from the supplier trading partner and make a payment via the computer system 106 to the supplier trading partner (step 716). The payment may be applied and updated in the accounts payable database via the computer system 106 and/or the finance system (step 718).

In an exemplary embodiment, the payment received from the customer trading partner at step 712 is not the same amount as the payment to the supplier trading partner at step 718. The computer system 106 may optionally apply a mark-up amount (and may add such an amount to the invoice prior to forwarding the invoice to the customer trading partner) depending on the specific implementation.

Trading partners may be given direct, substantially real time access to the computer system 106 for making changes to initialized information (e.g., forecast quantity changes, prices changes, inventory changes, etc.) stored in the database 108 and order information. Thus, information stored in the database 108 is substantially current and transactions among trading partners are processed in substantially real time in a highly automated manner.

In an exemplary embodiment, a new trading partner, whether customer or supplier, may be added where at least one of the trading partners is not known prior to receiving a purchase request in a transaction, but is identified in connection therewith. For example, a new customer trading partner may register just prior to submitting a purchase request and a new supplier trading partner may be identified in that purchase request. A new supplier or customer trading partner may be added to the computer system 106 by the seller/agent's authorized personnel The foregoing examples illustrate certain exemplary embodiments from which other embodiments, variations, and modifications will be apparent to those skilled in the art. The inventions should therefore not be limited to the particular embodiments discussed above, but rather is defined by the claims.

We claim:

1. A method for providing highly automated procurement services, comprising the steps of:
   (a) accessing a database initialized with information regarding a plurality of trading partners:
      (1) said plurality of trading partners including customer and non-customer trading partners;
      (2) said information including trading relationship information and pricing information involving at least a customer trading partner and another of said trading partners;
   (b) receiving a purchase request of a first trading partner among said trading partners;
   (c) automatically selecting at least one qualified trading partner from said trading partners based on said purchase request;
   (d) generating a purchase order based on:
      (1) a portion of said trading relationship information and pricing information pertaining to said at least one qualified trading partner;
      (2) said purchase request; and
      (3) without requiring direct communication between said first trading partner and said at least one qualified trading partner and without revealing said pricing information to said first trading partner;
   (e) forwarding said purchase order to said at least one qualified trading partner;
   (f) receiving a notification pertaining to said at least one qualified trading partner; and
   (g) automatically processing said notification, including forwarding said notification to said first trading partner.

2. The method of claim 1, wherein said step (a) further includes:
   (1) establishing terms and conditions with at least one of said plurality of trading partners; and
   (2) storing said terms and conditions into said database.

3. The method of claim 1, wherein said step (a) further includes:
   (1) establishing a purchase forecast with at least one of said plurality of trading partners; and
   (2) storing said purchase forecast into said database.

4. The method of claim 1, wherein said step (a) further includes:
   (1) establishing business rules; and
   (2) storing said business rules into said database.

5. The method of claim 4, wherein said business rules include rules for allocating said purchase order among said at least one qualified trading partners.

6. The method of claim 1, wherein said step (b) further includes:
   (1) prompting said first trading partner to provide identity verification information; and
   (2) receiving said purchase request after said first trading partner has been successfully verified.

7. The method of claim 1, wherein said step (c) further includes:
   (1) determining a business project identification associated with said purchase request;
   (2) reviewing information associated with said business project identification in said database; and
   (3) selecting at least one qualified trading partner based at least in part on said reviewing.

8. The method of claim 1, wherein said step (f) further includes:
   (1) prompting said at least one qualified trading partner to provide identity verification information; and
   (2) receiving said notification after said at least one qualified trading partner has been successfully verified.

9. The method of claim 1, wherein said step (f) further includes:
   (1) receiving an escalation process request; and
   (2) resolving said escalation process request.

10. The method of claim 9, wherein said step (2) includes the steps of:
    (A) requesting a negotiation with at least one of said first trading partner and said at least one qualified trading partner; and (B) forwarding an outcome of said requested negotiation to at least another of said first trading partner and said at least one qualified trading partner.

11. The method of claim 1, wherein:
   (1) said notification in said step (f) is an acknowledgment of said purchase order; and
   (2) said step (g) includes automatically forwarding said acknowledgment to said first trading partner.

12. The method of claim 1, wherein:
   (1) said notification in said step (f) is a shipment notice; and
   (2) said step (g) includes:
      (A) automatically forwarding said shipment notice to said first trading partner; and
      (B) automatically creating an accounts payable file and an accounts receivable file based on said shipment notice.

13. The method of claim 12, further comprising the steps of:
   (h) generating an invoice based on said accounts receivable file;
   (i) forwarding said invoice to said first trading partner;
   (j) receiving payment from said first trading partner based on said invoice; and
   (k) recording said payment in an accounts receivable database.

14. The method of claim 12, further comprising the steps of:
   (h) calculating payment to said at least one qualified trading partner based on said accounts payable file;
   (i) forwarding said payment to said at least one qualified trading partner; and
   (j) recording said payment in an accounts payable database.

15. The method of claim 1, further comprising the steps of:
   (h) receiving a change order request of at least one of said first trading partner and said at least one qualified trading partner;
   (i) automatically forwarding said change order request to another of said first trading partner and said at least one qualified trading partner;
   (j) receiving an escalation process request;
   (k) resolving said escalation process request.

16. The method of claim 15, wherein said step (k) further includes:
   (1) requesting a negotiation with said trading partner to whom said change order request is forwarded; and
   (2) forwarding an outcome of said requested negotiation to said trading partner of whom said change order request is received.

17. The method of claim 1, further comprising the steps of:
   (h) receiving purchase forecast information of said first trading partner;
   (i) automatically forwarding said purchase forecast information to said at least one qualified trading partner; and
   (j) storing said purchase forecast information in said database.

18. The method of claim 17, further comprising the steps of:
   (k) receiving an escalation process request; and
   (l) resolving said escalation process request.

19. The method of claim 18, wherein said step (l) further includes:

(1) requesting a negotiation with at least one of said first trading partner and said at least one qualified trading partner based on said escalation process request; and
(2) forwarding an outcome of said requested negotiation to at least another of said first trading partner and said at least one qualified trading partner.

20. The method of claim 1, wherein said pricing information of one trading partner is not revealed to another trading partner.

21. A method for providing highly automated procurement services, comprising the steps of:
   (a) accessing a database initialized with information regarding a plurality of trading partners:
      (1) said plurality of trading partners including customer and non-customer trading partners;
      (2) said information including trading relationship information and pricing information involving at least a customer trading partner and another of said trading partners;
   (b) receiving a purchase request of a first trading partner among said trading partners;
   (c) automatically selecting at least one qualified trading partner from said trading partners based on said information and said purchase request;
   (d) generating a purchase order based on said purchase request and pricing information, without requiring direct communication between said first trading partner and said at least one qualified trading partner and without revealing said pricing information to said first trading partner, said pricing information including a fixed price provided by said at least one qualified trading partner;
   (e) forwarding said purchase order to said at least one qualified trading partner;
   (f) receiving a notification pertaining to said at least one qualified trading partner; and
   (g) automatically processing said notification, including forwarding said notification to said first trading partner.

22. The method of claim 21, wherein said pricing information of one trading partner is not revealed to another trading partner.

23. A system for providing highly automated procurement services, comprising:
   (a) a database initialized with information regarding a plurality of trading partners:
      (1) said plurality of trading partners including customer and non-customer trading partners;
      (2) said information including trading relationship information and pricing information involving at least a customer trading partner and another of said trading partners; and
   (b) a computer system coupled to communications devices of said plurality of trading partners via a set of connection networks:
      (1) said computer system being coupled to said computer database;
      (2) said computer system being configured to receive a purchase request of a first trading partner among said plurality of trading partners;
      (3) said computer system being configured to generate a purchase order based on said information and said purchase request and without requiring direct communication between said first trading partner and another trading partner and without revealing pricing information pertaining to said another trading partner to said first trading partner, said pricing information including a fixed price provided by said at least one qualified trading partner;

(4) said computer system being configured to automatically forward said purchase order to at least one qualified trading partner selected from said trading partners based on said purchase request;

(5) said computer system being configured to received a notification from said at least one qualified trading partner; and (6) said computer system being configured to automatically process said notification.

24. The system of claim 23, where said computer system is configured to forward said notification to said first trading partner.

25. The system of claim 23, wherein said information includes terms and conditions with at least one of said plurality of trading partners.

26. The system of claim 23, wherein said information includes purchase forecast information from at least one of said plurality of trading partners.

27. The system of claim 23, wherein information includes business rules.

28. The system of claim 27, wherein said business rules include rules for allocating said purchase order among said at least one qualified trading partners.

29. The system of claim 23, wherein said computer system is:

(1) configured to determine a business project identification associated with said purchase request;

(2) configured to review information associated with said business project identification in said database; and (3) configured to select at least one qualified trading partner based at least in part on said review.

30. The system of claim 23, wherein said computer system is:

(1) configured to receive an escalation process request; and (2) configured to resolve said escalation process request.

31. The system of claim 23, wherein said notification is an acknowledgment of said purchase order.

32. The system of claim 23, wherein said notification is a shipment notice.

33. The system of claim 32, wherein said computer system is further configured to automatically create an accounts payable file and an accounts receivable file based on said shipment notice.

34. The system of claim 33, further includes an accounts receivable database, wherein said computer system is:

(h) configured to generate an invoice based on said accounts receivable file;

(i) configured to forward said invoice to said first trading partner;

(j) configured to receive payment from said first trading partner based on said invoice; and (k) configured to record said payment in said accounts receivable database.

35. The system of claim 33, further includes an accounts payable database, wherein said computer system is:

(h) configured to calculate payment to said at least one qualified trading partner based on said accounts payable file;

(i) configured to forward said payment to said at least one qualified trading partner; and (j) configured to record said payment in said accounts payable database.

36. The system of claim 23, wherein said computer system is:

(h) configured to receive a change order request of at least one of said first trading partner and said at least one qualified trading partner;

(i) configured to automatically forward said change order request to another of said first trading partner and said at least one qualified trading partner;

(j) configured to receive an escalation process request; and (k) configured to resolve said escalation process request.

37. The system of claim 23, wherein said computer system is:

(h) configured to receive purchase forecast information of said first trading partner;

(i) configured to automatically forward said purchase forecast information to said at least one qualified trading partner; and (j) configured to store said purchase forecast information in said database.

38. The system of claim 37, wherein said computer system is:

(k) configured to receive an escalation process request; and (l) configured to resolve said escalation process request.

39. The system of claim 23, wherein said pricing information of one trading partner is not revealed to another trading partner.

40. A computer-readable medium having computer-executable code thereon, which when executed by a computer causing said computer to provide highly automated procurement services, said computer-executable code comprising:

(a) logic code for accessing a database initialized with information regarding a plurality of trading partners:

(1) said plurality of trading partners including customer and non-customer trading partners;

(2) said information including trading relationship information and pricing information involving at least a customer trading partner and another of said trading partners;

(b) logic code for receiving a purchase request of a first trading partner among said trading partners;

(c) logic code for automatically selecting at least one qualified trading partner from said trading partners based on said purchase request;

(d) logic code for generating a purchase order based on:

(1) a portion of said trading relationship information and pricing information pertaining to said at least one qualified trading partner;

(2) said purchase request; and (3) without requiring direct communication between said first trading partner and said at least one qualified trading partner and without revealing said pricing information to said first trading partner, said pricing information including a fixed price provided by said at least one qualified trading partner;

(e) logic code for forwarding said purchase order to said at least one qualified trading partner;

(f) logic code for receiving a notification pertaining to said at least one qualified trading partner; and (g) logic code for automatically processing said notification, including forwarding said notification to said first trading partner.

41. The computer-readable medium of claim 40, wherein said (c) further includes:

(1) logic code for determining a business project identification associated with said purchase request;

(2) logic code for reviewing information associated with said business project identification in said database; and (3) logic code for selecting at least one qualified trading partner based at least in part on said reviewing.

42. The computer-readable medium of claim 40, wherein said (f) further includes:
(1) logic code for receiving an escalation process request; and
(2) logic code for resolving said escalation process request.

43. The computer-readable medium of claim 40, further comprising:
(h) logic code for receiving a change order request of at least one of said first trading partner and said at least one qualified trading partner;
(i) logic code for automatically forwarding said change order request to another of said first trading partner and said at least one qualified trading partner;
(j) logic code for receiving an escalation process request; and
(k) logic code for resolving said escalation process request.

44. The computer-readable medium of claim 43, further comprising:
(h) logic code for receiving purchase forecast information of said first trading partner;
(i) logic code for automatically forwarding said purchase forecast information to said at least one qualified trading partner; and
(j) logic code for storing said purchase forecast information in said database.

45. The computer-readable medium of claim 40, wherein said pricing information of one trading partner is not revealed to another trading partner.

46. A computer-readable medium having computer-executable code thereon, which when executed by a computer causing said computer to provide highly automated procurement services, said computer-executable code comprising:
(a) logic code for accessing a database initialized with information regarding a plurality of trading partners:
(1) said plurality of trading partners including customer and non-customer trading partners;
(2) said information including trading relationship information and pricing information involving at least a customer trading partner and another of said trading partners;
(b) logic code for receiving a purchase request of a first trading partner among said trading partners;
(c) logic code for automatically selecting at least one qualified trading partner from said trading partners based on said information and said purchase request;
(d) logic code for generating a purchase order based on said purchase request and pricing information, without requiring direct communication between said first trading partner and said at least one qualified trading partner and without revealing pricing information to said first trading partner, said pricing information including a fixed price provided by said at least one qualified trading partner;
(e) logic code for forwarding said purchase order to said at least one qualified trading partner;
(f) logic code for receiving a notification pertaining to said at least one qualified trading partner; and
(g) logic code for automatically processing said notification, including forwarding said notification to said first trading partner.

47. The computer-readable medium of claim 46, wherein said pricing information of one trading partner is not revealed to another trading partner.

48. A computer system for providing highly automated procurement services, comprising:
(a) means for accessing a database initialized with information regarding a plurality of trading partners:
(1) said plurality of trading partners including customer and non-customer trading partners;
(2) said information including trading relationship information and pricing information involving at least a customer trading partner and another of said trading partners;
(b) means for receiving a purchase request of a first trading partner among said trading partners;
(c) means for automatically selecting at least one qualified trading partner from said trading partners based on said purchase request;
(d) means for generating a purchase order based on:
(1) a portion of said trading relationship information and pricing information pertaining to said at least one qualified trading partner;
(2) said purchase request; and
(3) without requiring direct communication between said first trading partner and said at least one qualified trading partner and without revealing said pricing information to said first trading partner, said pricing information including a fixed price provided by said at least one qualified trading partner;
(e) means for forwarding said purchase order to said at least one qualified trading partner;
(f) means for receiving a notification pertaining to said at least one qualified trading partner; and
(g) means for automatically processing said notification, including forwarding said notification to said first trading partner.

49. The computer system of claim 48, wherein said (c) further includes:
(1) means for determining a business project identification associated with said purchase request;
(2) means for reviewing information associated with said business project identification in said database; and
(3) means for selecting at least one qualified trading partner based at least in part on said reviewing.

50. The computer system of claim 48, wherein said (f) further includes:
(1) means for receiving an escalation process request; and
(2) means for resolving said escalation process request.

51. The computer system of claim 48, further comprising:
(h) means for receiving a change order request of at least one of said first trading partner and said at least one qualified trading partner;
(i) means for automatically forwarding said change order request to another of said first trading partner and said at least one qualified trading partner;
(j) means for receiving an escalation process request; and
(k) means for resolving said escalation process request.

52. The computer system of claim 48, further comprising:
(h) means for receiving purchase forecast information of said first trading partner;
(i) means for automatically forwarding said purchase forecast information to said at least one qualified trading partner; and
(j) means for storing said purchase forecast information in said database.

53. The computer system of claim 48, wherein said pricing information of one trading partner is not revealed to another trading partner.

* * * * *

UNITED STATES PATENT AND TRADEMARK OFFICE
CERTIFICATE OF CORRECTION

| | | |
|---|---|---|
| PATENT NO. | : 7,236,947 B2 | Page 1 of 1 |
| APPLICATION NO. | : 10/056471 | |
| DATED | : June 26, 2007 | |
| INVENTOR(S) | : Frieder Eckert et al. | |

It is certified that error appears in the above-identified patent and that said Letters Patent is hereby corrected as shown below:

In column 12, line 14, in Claim 1, after "said first" delete "trading partner" and insert -- trading partner, said pricing information including a fixed price provided by said at least one qualified trading partner --, therefor.

In column 13, line 66, in Claim 19, delete "(1)" and insert -- (l) --, therefor.

In column 15, line 7, in Claim 23, delete "received" and insert -- receive --, therefor.

Signed and Sealed this

Seventh Day of April, 2009

JOHN DOLL
*Acting Director of the United States Patent and Trademark Office*